United States Patent Office 3,418,259
Patented Dec. 24, 1968

3,418,259
CRYSTALLINE POLYBENZYLS AND PROCESS OF PRODUCING SAME
Joseph P. Kennedy, Clark, and Robert B. Isaacson, Roselle, N.J., assignors to Esso Research and Engineering Company, a corporation of Delaware
No Drawing. Filed Oct. 30, 1964, Ser. No. 407,896
16 Claims. (Cl. 260—2)

ABSTRACT OF THE DISCLOSURE

Crystalline polybenzyls are prepared by the polymerization of benzyl halides with a Friedel Crafts catalyst at a temperature of between about −50° C. and about −145° C.; amorphous copolymers of benzyl halides and $C_3$–$C_8$ α-monoolefin under the same conditions are also prepared.

---

The present invention relates to a process for the production of crystalline homopolymers of aralkyl halides, amorphous copolymers of aralkyl halides and to the polymer compositions produced thereby. In particular, this invention relates to a process for preparing crystalline polybenzyls and alkyl substituted derivatives thereof. More particularly, this invention relates to the low temperature, Friedel-Crafts polymerization of aralkyl halides represented by the following structural formula:

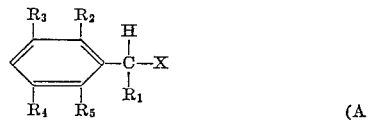
(A)

wherein $R_1$ through $R_5$ are each selected from the group consisting of hydrogen and $C_1$–$C_4$ alkyl, and X is halogen. Still more particularly, this invention relates to the polymerization of benzyl halides, α-($C_1$–$C_4$ alkyl) benzyl halides and 2,5-($C_1$–$C_4$ dialkyl) benzyl halides with a Friedel-Crafts type catalyst at a temperature of between about −50° C. and about −145° C.

The polycondensation of benzyl halides in the presence of Friedel-Crafts catalysts at temperatures above 0° C. is well-known in the art. See, for example, "Polymers From Benzyl Chloride and Related Compounds," by Ralph A. Jacobson, J.A.C.S. 54, p. 1513 (1932); "Catalysts for the Polymerization of Benzyl Chloride," by O. C. Dermer et al., J.A.C.S. 63, p. 3525 (1941); and "Polybenzyl Type Polymers," by H. C. Haas et al., J. Pol. Sci. 15, p. 503 (1955). Depending on the Friedel-Crafts catalyst employed for the polycondensation, resins more or less insoluble in benzene or soluble in benzene are obtained. It is further known that thermoplastic condensation products of aralkyl halides, which range from viscous liquids to resinous solids, are obtained by polymerizing aralkyl halides with Friedel-Crafts type catalysts at temperatures between 0° C. and −45° C. See U.S. Patent 2,241,488 issued to Sparks et al. More recently, organo-aluminum compounds have been utilized to polymerize benzyl halides at 0° C. See Japanese Patent 24,599. However, the preparation of crystalline polybenzyls by any means has not been reported. It has now been found that crystalline polybenzyls can be prepared with Friedel-Crafts type catalysts in halogenated hydrocarbon solvents by employing specific temperatures considerably below 0° C.

It is, therefore, an object of the present invention to provide the art with a process for preparing crystalline homopolymers of aralkyl halides and amorphous copolymers of aralkyl halides. Other objects, as well as advantages of the present invention, will become clear from the following description and examples.

According to the present invention crystalline polybenzyls are prepared by polymerizing aralkyl halides of the following structural formula:

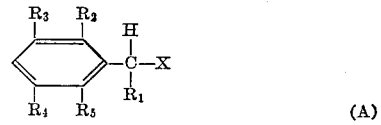
(A)

wherein $R_1$ through $R_5$ are each selected from the group consisting of hydrogen and $C_1$–$C_4$ alkyl, and X is halogen, in an halogenated hydrocarbon solvent with a Friedel-Crafts type catalyst at a temperature of between about −50° C. and about −145° C. More specifically, it has been discovered that when the aromatic nucleus is unsubstituted, it is more desirable to carry out the polymerization reaction within the temperature range of between about −90° C. and about −145° C. When the aromatic ring is substituted with alkyl substituents, e.g., 2,5-dimethyl benzyl chloride, it is desirable to perform the polymerization reaction within the temperature range of between about −50° C. and about −100° C. and preferably between about −78° C. and about −100° C.

It has also been discovered that benzyl halides can be copolymerized with styrene or $C_3$–$C_8$ α-monoolefins under the same reaction conditions as recited hereabove for the preparation of crystalline polybenzyls. Thus, in accordance with the present novel process, a benzyl halide, such as benzyl chloride, can be copolymerized with propylene, for example, in a halogenated hydrocarbon solvent, with a Friedel-Crafts type catalyst and at a temperature of between about −50° C. and about −145° C. to yield a copolymer. These copolymers are amorphous.

The aralkyl halides that are utilized in the present novel process can generally be represented by the structural formula:

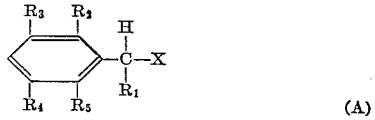
(A)

wherein $R_1$ through $R_5$ are each selected from the group consisting of hydrogen and $C_1$–$C_4$ alkyl and X is a halogen, i.e., chlorine, bromine, fluorine and iodine. The present process is especially applicable to benzyl halides, α-($C_1$–$C_4$ alkyl) benzyl halides and 2,5-($C_1$–$C_4$ dialkyl) benzyl halides. These latter three groups of benzyl halides can be more definitively represented structurally by the following formulae:

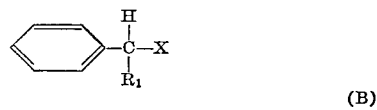
(B)

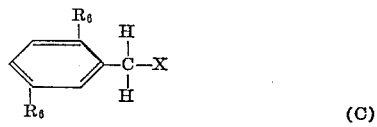
(C)

wherein $R_1$ and X are as defined hereabove, and $R_6$ is a $C_1$–$C_4$ alkyl.

Examples of suitable aralkyl halide compounds utilized in the present novel process include: benzyl chloride, benzyl bromide, benzyl fluoride, 2-methylbenzyl chloride, 3-ethylbenzyl chloride, 3-propylbenzyl chloride, 3-methylbenzyl bromide, 3,5-dimethylbenzyl chloride, 2,5-dimethylbenzyl chloride, 2,6-diethylbenzyl chloride, 2,3,5,6-tetramethylbenzyl chloride, 2,5-diethylbenzyl bromide, α-methylbenzyl chloride, α-propylbenzyl chloride, α-methyl benzyl bromide, etc.

Suitable examples of olefins with which the benzyl halides of the present invention can be copolymerized include: styrene and $C_3$–$C_8$ α-monoolefins such as propylene, butene-1, pentene-1, hexene-1, etc. The mole ratio of benzyl halide to styrene or $C_3$–$C_8$ α-monoolefin in the monomer feed can vary between about 0.5:1 and about 99:1. A mole ratio of 1:1 is preferred.

Any of the Friedel-Crafts type catalysts conventionally utilized in cationic polymerizations can be employed as a catalyst for the present novel process. These include the conventional metal halides, such as aluminum chloride, as well as the organo-aluminum halides such as ethyl aluminum dichloride. Examples of suitable metal halides include: aluminum chloride, aluminum bromide, boron trifluoride, boron trifluoride etherate complex, titanium tetrachloride, titanium tetrabromide, zirconium tetrachloride, zirconium tetrabromide, ferric chloride, stannic chloride, zinc chloride, molybdenum pentachloride, niobium pentachloride, vanadium tetrachloride, antimony pentachloride and gallium trichloride.

The organo-aluminum halide catalysts can be represented by the empirical formula $R_nAlX_m$, wherein R is a branched or straight chain alkyl group having from 1 to 12 carbon atoms, X is halogen, $m$ and $n$ are integers of from 1 to 2 and $m+n$ equals 3. When $n$ is 2, the alkyl groups need not be the same. Suitable examples of organo-aluminum halides include diethyl aluminum chloride, ethyl aluminum dichloride, butyl aluminum dibromide, dipropyl aluminum chloride, dibutyl aluminum chloride, diisobutyl aluminum chloride, diethyl aluminum bromide, diethyl aluminum iodide, dipentyl aluminum chloride, didecyl aluminum chloride, diisobutyl aluminum bromide, dioctyl aluminum bromide, octyl aluminum dichloride, ethyl propyl aluminum chloride, methyl ethyl aluminum chloride, etc. The preferred catalysts are ethyl aluminum dichloride and aluminum chloride.

The amount of catalyst employed can vary over a considerable range but, in general, the mole ratio of total monomer feed to catalyst will range between about 10,000:1 and about 10:1, preferably between about 1000:1 and about 100:1. In general, the catalyst employed is usually dissolved in a portion of the diluent employed in the condensation reaction. This solution is precooled and added to a solution of the monomers to be polymerized or copolymerized in the same solvent, or a different but compatible one, maintained at the polymerization temperature. Alternatively, the monomer feed can be added to a precooled catalyst-diluent solution. The actual sequence of admixing the monomer, catalyst and diluent is not critical to the present novel process and any suitable sequence can be used.

In preparing the crystalline polybenzyls of the present process, it has been found necessary to perform the polymerization reaction in a halogenated hydrocarbon diluent. Suitable compounds which can be used, either as solvent for the catalyst or as diluent, are the conventional alkyl halides which are inert and liquid under the polycondensation temperature conditions employed. Examples of solvents that have been found to be suitable, depending upon the particular temperature employed, include: methyl chloride, ethyl chloride, propyl chloride, chloroform, ethylene dichloride, vinyl chloride, methyl bromide, ethyl bromide, 1,1-dichloroethane, chlorobenzene, dichlorobenzene, bromobenzene, methylene dichloride and mixtures thereof. The preferred diluent is methyl chloride although other suitable diluents selected from those hereabove mentioned could just as easily be employed since the diluent serves merely as a vehicle for carrying out the reaction. Generally, between about 50 and about 500 parts of diluent are added per 100 parts of monomer feed. Homopolymerization of the benzyl halides of the present novel process can be performed in bulk, i.e., without added diluent. In that case, the excess monomer, which is itself a halogenated hydrocarbon, acts as the diluent.

The temperatures employed in preparing the crystalline polybenzyls of the present process, in general, range between about −50° C. and about −145° C. Where the benzene ring is unsubstituted, such as in benzyl chloride and α-methylbenzyl chloride, polymerization is desirably performed at a temperature of at about −90° C. or below. Accordingly, the polymerization of unsubstituted aralkyl halides is preferably performed within a temperature range of between about −90° C. and about −145° C., and more preferably between about −100° C. and about −135° C. When the aromatic ring is substituted with alkyl substituents, such as in 2,5-dimethyl benzyl chloride, somewhat higher temperatures can be employed if desired. Accordingly, the polymerization of alkyl nuclear substituted benzyl halides can be performed within a temperature range of between about −50° C. and about −145° C. and preferably between about −78° C. and about −100° C. Similarly, the copolymerization of benzyl halides with styrene or $C_3$–$C_8$ α-monoolefins is performed within a temperature range of between about −50° C. and about −145° C. and preferably between about −78° C. and about −100° C. The pressure employed in the present novel process will generally be at or near atmospheric. The time necessary for effective reaction is not critical although it is well to allow sufficient time for the polymerization to reach substantial equilibrium and thus completion. Depending upon the monomer and temperature employed, reaction times can vary between about 1 second and about 8 hours and usually range between about 10 minutes and about 1 hour.

The polybenzyls of the present novel process are generally colorless, i.e., white, powdery solids that range in number average molecular weight between about 600 and about 4,000. They are crystalline, exhibit a high melting point and have a lower solubility in benzene than the entirely amorphous polycondensation products. The crystalline polymers readily lend themselves to the formation of films and molding compositions or, in other words, to uses in which higher structural strength materials are customarily employed. These crystalline polymers are novel and the uses to which they are put are those to which other similar polymers of high crystallinity have been put.

The copolymer products of the present novel process are amorphous and can be used for coatings, molding (either by compression or by injection techniques), or casting purposes. The copolymers represent high strength plastics useful both for the construction or building industries and for domestic goods.

The molecular weights of the polymers prepared in the ensuing examples were obtained by means of osmometry and crystallinity was verified by means of X-ray diffraction patterns.

The various aspects and modifications of the present novel process will be made more clearly apparent by reference to the following description and accompanying examples.

Example 1

To a mixture of 25 ml. benzyl chloride and 250 ml. ethyl chloride at −134° C. there was added dropwise, under constant stirring and nitrogen atmosphere, a total of 17.5 ml. of 3.48 wt. percent aluminum chloride in ethyl chloride solution over a period of 25 minutes. Polymerization proceeded readily and could be followed by the increasing haziness in the reactor. The polymerization reaction was terminated by adding precooled (−130° C.) n-propanol to the reaction mixture. The total reaction mixture was added to 1,000 ml. of cold methanol whereupon a white polymer settled out overnight. After filtering and drying at 60° C. in vacuo, 3.7 grams of a white, powdery material were obtained. The product was soluble in benzene and had a melting point range of 90–

94° C. X-ray diffraction analysis indicated crystallinity characterized by the following $d$ spacings: 6.6, 5.0 and 4.1 ($\pm 0.10$) A. units.

Example 2

In an analogous manner to Example 1, ethyl aluminum dichloride was used as the catalyst. Polymerization occurred readily and a crystalline polymer of benzyl chloride was recovered.

Example 3

0.1 mole of α-methylbenzyl chloride was added to 20 ml. of ethyl chloride at −130° C. $7.9 \times 10^{-3}$ mole of aluminum chloride in ethyl chloride solvent was added as the catalyst. Polymerization started immediately and was permitted to go to completion. 1.472 grams of a white, powdery solid were recovered. X-ray diffraction analysis showed the product to be crystalline, characterized by $d$ spacings at 5.28, 4.62 and 3.56 ($\pm 0.10$) A. units. The polymer product was soluble in toluene and had a melting point range of 185–189° C.

Example 4

7.0 grams (0.045 mole) of 2,5-dimethyl benzyl chloride were mixed with 30 ml. of methyl chloride and polymerized with $2.45 \times 10^{-4}$ mole of aluminum chloride in ethyl chloride solution at −78° C. The catalyst was added over a period of 38 minutes and the total polymerization time was 80 minutes. Polymerization proceeded readily as observed by a haziness which developed during the course of the reaction. Polymerization was terminated by the introduction of cold methanol into the reaction mixture. After washing with methanol on the filter and drying in vacuo at 60° C., 4.3 grams (61% conversion) of a white, powdery material were recovered. X-ray diffraction analysis indicated crystallinity with 5 well-defined $d$ spacings at 6.5, 4.92, 4.05, 3.31 and 2.26 ($\pm 0.10$) A. units. A number of less sharp diffractions were also present. The product had a melting poitnt range of 148–152° C. and was soluble in hot benzene.

Example 5

In a similar manner to Example 4, 0.176 mole of 2,5-dimethyl benzyl chloride was mixed with 250 ml. of ethyl chloride and polymerized with $4.1 \times 10^{-3}$ mole of aluminum chloride in ethyl chloride solvent at −135° C. Polymerization proceeded readily and was terminated with cold methanol. 2.24 grams of a white, powdery solid were recovered. X-ray diffraction analysis revealed a crystalline product characterized by $d$ spacings at 6.3, 4.85, 3.98 and 3.30 ($\pm 0.10$) A. units. The polymer product was soluble in hot benzene, insoluble in carbon tetrachloride, and had a melting point range of 180–194° C. This product had a higher molecular weight and higher degree of crystallinity than the product of Example 4 and therefore showed a higher melting point range.

Example 6

0.0113 mole of benzyl chloride and 0.113 mole of styrene were mixed and added to 20 ml. of methyl chloride at −78° C. $6 \times 10^{-5}$ mole of aluminum chloride in ethyl chloride solvent was added as the catalyst. Polymerization commenced immediately and was terminated with cold methanol. 12.0 grams of copolymer product having a molecular weight of 5,099 were recovered. The product was a white, amorphous, flaky solid which had a melting point range of 120–150° C. The product was soluble in toluene, chlorobenzene and carbon tetrachloride; was partially soluble in acetone; and was insoluble in pentane and heptane.

Example 7

0.045 mole of benzyl chloride and 0.045 mole of styrene were mixed and added to 20 ml. of methyl chloride at −78° C. A total of $6.4 \times 10^{-5}$ mole aluminum chloride catalyst in ethyl chloride solvent was added over a period of 22 minutes. The polymerization reaction was terminated with cold methanol and 5.2 grams of an amorphous copolymer were recovered and dried in vacuo at 60° C. The product had a molecular weight of 12,653 (extracted in chlorobenzene), a melting point range of 122–125° C. and was soluble in toluene, chlorobenzene and carbon tetrachloride. The product was insoluble in pentane and heptane and partially soluble in acetone.

Example 8

0.09 mole of benzyl chloride and 0.09 mole of propylene were added to 20 ml. of methyl chloride at −78° C. To this admixture was added $4.9 \times 10^{-4}$ mole of aluminum chloride catalyst in ethyl chloride solvent. The reaction commenced immediately upon introduction of the catalyst and was terminated at completion with cold methanol. 5.0 grams of an amorphous copolymer product were recovered. The copolymer was soluble in toluene and 47.5% soluble in pentane. Nuclear magnetic resonance spectrometer analysis indicated a copolymer of about 75% of polybenzyl and about 25% polypropylene.

Example 9

In a manner analogous to that of Example 8, benzyl chloride and hexene-1 are copolymerized at a temperature of about −78° C. An amorphous copolymer product similar to that obtained in Example 8 is recovered.

While there are above described a number of specific embodiments of the present invention, it is obviously possible to produce other embodiments and various equivalent modifications and variations thereof without departing from the spirit of the invention.

Having set forth the general nature and specific embodiments of the present invention, the true scope is now particularly pointed out in the appended claims.

What is claimed is:

1. A process for preparing crystalline polybenzyls which comprises polymerizing a benzyl halide represented by the structural formula:

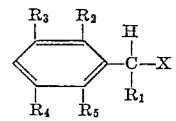

wherein $R_1$ through $R_5$ are each selected from the group consisting of hydrogen and $C_1$–$C_4$ alkyl, and X is halogen, with a Friedel-Crafts type catalyst at a temperature of between about −100° C. and about −145° C., in a solvent selected from the group consisting of methyl chloride, ethyl chloride, propyl chloride, chloroform, ethylene dichloride, vinyl chloride, methyl bromide, ethyl bromide, 1,1 - dichloroethane, chlorobenzene, dichlorobenzene, bromobenzene, methylene dichloride, and mixtures thereof.

2. A process according to claim 1 wherein the benzyl halide is selected from the group consisting of benzyl chloride and α-methylbenzyl chloride.

3. A process according to claim 1 wherein the Friedel-Crafts type catalyst is selected from the group consisting of aluminum chloride and ethylaluminum dichloride.

4. A process for preparing crystalline polybenzyls which comprises polymerizing a benzyl halide represented by the structural formula:

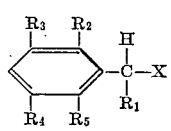

wherein $R_1$ is selected from the group consisting of hydrogen and $C_1$–$C_4$ alkyl, at least one of $R_2$ through $R_5$ are $C_1$–$C_4$ alkyl with the remainder hydrogen, and X is halogen, with a Friedel-Crafts type catalyst at a temperature of between about −78° C. and about −100° C., in a solvent selected from the group consisting of methyl chloride, ethyl chloride, propyl chloride, chloroform, ethylene dichloride, vinyl chloride, methyl bromide, ethyl bromide, 1,1-dichloroethane, chlorobenzene, dichlorobenzene, bromobenzene, methylene dichloride, and mixtures thereof.

5. A process according to claim 4, wherein the benzyl halide is 2,5-dimethyl benzyl chloride.

6. A process which comprises polymerizing benzyl chloride with a Friedel-Crafts catalyst at −134° C. in ethyl chloride solvent and recovering crystalline polybenzyl.

7. A process which comprises polymerizing α-methylbenzyl chloride with a Friedel-Crafts catalyst at −100° C. in ethyl chloride solvent and recovering crystalline poly(α-methylbenzyl).

8. A process which comprises polymerizing 2,5-dimethyl benzyl chloride with a Friedel-Crafts catalyst at −78° C. in ethyl chloride solvent and recovering crystalline poly(2,5-dimethyl benzyl).

9. A process which compries copolymerizing a benzyl halide represented by the structural formula:

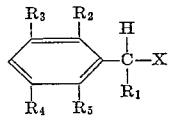

wherein $R_1$ through $R_5$ are each selected from the group consisting of hydrogen and $C_1$–$C_4$ alkyl, and X is halogen, with a $C_3$–$C_8$ α-monoolefin, in the presence of a Friedel-Crafts type catalyst, at a temperature of between about −50° C. and about −145° C. in a solvent selected from the group consisting of methyl chloride, ethyl chloride, propyl chloride, chloroform, ethylene dichloride, vinyl chloride, methyl bromide, ethyl bromide, 1,1-dichloroethane, chlorobenzene, dichlorobenzene, bromobenzene, methylene dichloride, and mixtures thereof.

10. A process according to claim 9 wherein the benzyl halide is benzyl chloride.

11. A process according to claim 9 wherein the benzyl halide is benzyl chloride and the α-monoolefin is propylene.

12. Crystalline polybenzyl which has X-ray diffraction *d* spacings at 6.6, 5.0 and 4.1 (±0.10) Angstrom units and a melting point range of between about 90° C. and about 94° C.

13. Crystalline poly(α-methylbenzyl) which has X-ray diffraction *d* spacings at 5.28, 4.62 and 3.56 (±0.10) Angstrom units and a melting point range of between about 185° C. and about 189° C.

14. A composition prepared by copolymerizing a benzyl halide represented by the structural formula:

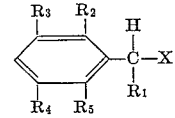

wherein $R_1$ through $R_5$ are each selected from the group consisting of hydrogen and $C_1$–$C_4$ alkyl, and X is halogen, with a $C_3$–$C_8$ α-monoolefins, in the presence of a Friedel-Crafts type catalyst, at a temperature of between about −50° C. and about −145° C. in a solvent selected from the group consisting of methyl chloride, ethyl chloride, propyl chloride, chloroform, ethylene dichloride, vinyl chloride, methyl bromide, ethyl bromide, 1,1,-dichloroethane, chlorobenzene, dichlorobenzene, bromobenzene, methylene dichloride, and mixtures thereof.

15. A composition according to claim 14 wherein the benzyl halide is benzyl chloride.

16. A composition according to claim 14 wherein the benzyl halide is benzyl chloride and the α-monoolefin is propylene.

References Cited

UNITED STATES PATENTS

| | | | |
|---|---|---|---|
| 3,346,514 | 10/1967 | Isaacson et al. | 260—2 |
| 2,240,583 | 5/1941 | Sparks et al. | 260—2 |
| 2,241,488 | 5/1941 | Sparks et al. | 260—2 |
| 2,322,670 | 6/1943 | Sparks et al. | 260—2 |

FOREIGN PATENTS 24,599  11/1963  Japan.

OTHER REFERENCES

Kennedy et al.: "Jour. of Macromolecular Chemistry," vol. 1, No. 3, July 1966, pp. 541–552.

Vansheidt et al.: "Chemical Abstracts," vol. 59 (1963), col. 769–770 and 7446.

SAMUEL H. BLECH, *Primary Examiner.*

U.S. Cl. X.R.

260—93.5, 93.7